United States Patent [19]

Saitou et al.

[11] Patent Number: 4,490,149

[45] Date of Patent: Dec. 25, 1984

[54] MODIFICATION OF POLYESTER PRODUCTS

[75] Inventors: Kouichi Saitou, Kusatsu; Shunroku Tohyama, Shiga; Yoshikazu Kosaka, Otsu, all of Japan

[73] Assignee: Toray Industries, Inc., Tokyo, Japan

[21] Appl. No.: 530,652

[22] Filed: Sep. 9, 1983

[30] Foreign Application Priority Data

Dec. 29, 1982 [JP] Japan ................ 57-231990

[51] Int. Cl.$^3$ .......................... C08F 1/13; D06P 3/00
[52] U.S. Cl. ............................. 8/539; 8/922
[58] Field of Search ............................ 8/539

[56] References Cited

FOREIGN PATENT DOCUMENTS 45-502   1/1970  Japan.
48-27743 8/1973  Japan.
48-68694 9/1973  Japan.

Primary Examiner—A. Lionel Clingman
Attorney, Agent, or Firm—Wegner & Bretschneider

[57] ABSTRACT

A process for producing modified polyester products by the graft polymerization of vinyl monomers having an acidic group and replacing the acidic group with an alkali metal salt, the replacing being carried out after dyeing. By this process, decrease in strength and color fastness of polyester fibers can be avoided while giving the polyesters characteristics similar to those of cotton.

5 Claims, No Drawings

MODIFICATION OF POLYESTER PRODUCTS

FIELD OF THE INVENTION

The present invention relates to the modification of polyester products by graft polymerization and more particularly to a modification process for polyester products for giving the products characteristics similar to those of cotton while avoiding a decrease in strength and color fastness.

DESCRIPTION OF THE PRIOR ARTS

Heretofore the processes of the modification of polyester products by the graft polymerization of vinyl monomers having an acidic group have been known from Japanese patent application publication Nos. 502/1970 and 27743/1973 (Tokko-sho Nos. 45-502 and 48-27743) and Laid-open Japanese patent application publication No. 68694/1973 (Tokkai-sho No. 48-68694). These processes however considerably decrease polyester products in strength and color fastness particularly when the hydrogen atom of the acidic group is replaced with an alkali metal to give the polyester products sufficient hygroscopicity.

An object of the present invention is therefore to obtain practicable modified polyester dyed products not considerably decreased in strength and color fastness.

SUMMARY OF THE INVENTION (1) In a first aspect of the invention there is provided a process for producing modified polyester products, comprising dyeing polyester products obtained by the graft polymerization of vinyl monomers having an acidic group and replacing said acidic group with an alkali metal salt, wherein said replacing is carried out after said dyeing. In a preferred embodiment, the replacing is carried out at a temperature under 80° C. In an especially preferred embodiment, the replacing is carried out at a temperature under 60° C. Preferably the graft polymerization is carried out in the presence of both a swelling agent for the polyester and a polymerization initiator and the replacement step is carried out after treatment to remove the swelling agent. The removing treatment for the swelling agent is preferably carried out at a temperature over 160° C. in the dry state.

DESCRIPTION OF THE PREFERRED EMBODIMENTS

The above processes make it possible to provide highly-practicable graft-modified and dyed polyester products without a serious decrease of strength, color fastness to light, and durability against friction in the wet condition.

They will be described in further detail hereinunder.

Typical vinyl monomers having an acidic group useful in the present invention include vinyl carboxylic acid compounds such as acrylic acid, methacrylic acid, maleic acid, itaconic acid, and butene tricarboxylic acid, as well as vinyl sulfonic acid compounds such as allyl sulfonic acid and styrene sulfonic acid. It is possible to use mixtures of vinyl carboxylic acid compounds and/or vinyl sulfonic acid compounds with various kinds of hydrophilic vinyl monomers such as hydroxyethyl acrylate, hydroxyethyl methacrylate, hydroxypropyl acrylate, hydroxypropyl methacrylate, acrylamide, methacrylamide, and N-methylol acrylamide, and various kinds of hydrophobic vinyl monomers such as methyl acrylate and methyl methacrylate. However, monomers having a hydrophilic vinyl carboxylic group are desirable for the cotton-like modification of polyester products.

The polymerization initiators useful in carrying out the invention include organic peroxides such as benzoyl peroxide and methoxy benzoyl peroxide and organic compounds such as azobis-isobutyronitrile and azobis-valeronitrile.

Many of the polymerization initiators are generally not soluble in water. A surface active agent such as an alkyl phenol ethylene oxide adduct and an alkyl phosphate ethylene oxide adduct is often used to emulsify or disperse water-insoluble polymerization initiators.

The swelling agents useful for introducing a polymerization initiator into polyester products of the present invention include monochlorobenzene, dichlorobenzene, trichlorobenzene, benzoic acid, phenol, methyl salicylate, diphenyl, diphenyl methane, triphenyl methane, o-phenyl phenol, p-phenyl phenol, and o-cresol.

In the present invention, the graft polymerization of the vinyl monomers into polyester products includes the following processes but are not limited thereto: a process to first introduce an organic peroxide such as benzoyl peroxide into the polyester products using a swelling agent such as monochlorobenzene, then heating in an aqueous solution containing one or several kinds of vinyl monomer(s) which have an acidic group e.g., acrylic acid, methacrylic acid, etc.; a process of heating in a solution that contains an organic peroxide catalyst such as benzoyl peroxide, a swelling agent such as monochlorobenzene, and the above-mentioned vinyl monomer(s) having an acidic group; and other processes.

The polyester products of the present invention include the ordinary kinds of polyester products known as the reaction products between terephthalic acid or isophthalic acid or their esters and glycols such as ethylene glycol, 1,4-butanediol, or 1,6-hexanediol. Mixing the polyester products with 5-sodium sulfoisophthalate or a polyamide compound e.g., nylon, can be done by copolymerization or blending, as well as side-by-side and core-sheath composite fiber spinning. This invention may be applied to any of such forms as staple, tow, filament, web, sliver, spun yarn, textured yarn, knitted fabric, textile, nonwoven cloth, and film, as well as mixing through spinning, weaving and knitting with natural fibers and other synthetic fibers.

The alkali metal used in the present invention includes the general kinds of alkali metal shown in the Periodic Table. Alkali metal salts are obtained by the replacement of the hydrogen atoms of the carboxylic or sulfonic acid groups introduced into polyester products by vinyl monomer with the cations of lithium hydroxide, potassium hydroxide, sodium hydroxide, lithium carbonate, potassium carbonate, and sodium carbonate.

Conventionally, polyester products are subjected to the above process and to an ordinary process of dyeing with ordinary kinds of disperse dye at the high temperatures of 130°–135° C. and high pressures. As stated previously the dyeing process considerably decreases the strength of the modified polyester to $\frac{1}{3}$–1/10 of its original value, and extremely deteriorates the modified polyester in color fastness to washing, wet friction, and light, when it is subjected to replacement in an aqueous alkali metal salt solution to give a hygroscopicity substantially equal to that of cotton.

The present inventors found that the lower the replacement temperature, the smaller the decrease in strength. For instance, at 80° C., the loss of strength is much smaller than at 100° C. That is, this decrease is considerably reduced if the replacement temperature is fixed below 80° C., desirably below 60° C.

However, the modified products lose their commodity value, provided they are heated to the high temperatures of 130°-135° C. in the next process of dyeing.

In the present invention, the decrease in strength of dyed polyester products is drastically reduced. Namely the dyeing is carried out after the graft polymerization and before the alkali metal replacement. Though ordinary processes of dyeing polyesters are available, it is desirable to lower the dyeing temperature by 10°-30° C. for maintaining the strength of polyester products. Further it is necessary to fix the alkali metal replacement temperature after dyeing below 80° C., desirably below 60° C., although ordinary precedented replacement temperatures are 80°-100° C.

In this invention, it was also found that polyester products can be prevented from decreasing in strength and color fastness if the temperature of replacement with an allaki metal is fixed below 80° C., desirably below 60° C., more desirably below 40° C.

The replacement of the present invention can be carried out by immersion of polyester products in an aqueous solution containing alkali metal bases as stated above, below 80° C., desirably 60° C., more desirably below 40° C., or applying the solution through padding, spray or showering and leaving the products below those temperatures. The most practicable process is the so-called batch roll system or cold batch system in which the polyester products are immersed in or padded with an aqueous solution of an alkali metal compound and left in a room below 80° C., desirably below 60° C., more desirably below 40° C.

After dyeing, replacement with an alkali metal may be conducted at the same time as reduction clearing in which a reducing agent such as sodium hydrosulfite or a nonionic surface active agent is used.

In the present invention, therefore, it is preferable to remove the swelling agent between the steps of graft polymerization and alkali metal replacement. The swelling agent remaining in dyed polyester products promotes the fall of dye in washing at households and its decomposition by sunlight. Available methods of swelling agent removal are dry heat-treatment above the temperature of 160° C., steam heat-treatment above the temperature of 100° C., overheated steam treatment, and washing with an anionic or nonionic surface active agent, among which the first is simplest and most effective. The swelling agent removal can be done at any stage after the graft polymerization and before the alkali metal replacement. If high-temperature heat-treatment for swelling agent removal such as dry heat-treatment above the temperature of 160° C. is carried out after alkali metal replacement, such a serious problem arises as the polyester products considerably decrease in strength. For that reason, swelling agent removal at high temperature is therefore necessary before alkali metal replacement.

Dyeing after alkali metal replacement considerably decreases polyester product properties even if swelling agent removal is carried out before alkali metal replacement. A desirable way for solving this problem is to carry out graft polymerization, swelling agent removal, dyeing, and alkali metal replacement in this order, or graft polymerization, dyeing, swelling agent removal, and alkali metal replacement in this order, of which the former is more desirable in view of its processability.

In usual cases, heat-setting, if necessary finishing at high temperature with a softener, resin, and antistatic agent, and dry heat-setting are often applied after dyeing and alkali metal replacement. However, in the case of the modified polyester products of this invention, it is recommended to carry out the final heat-setting below the temperature of 160° C., desirably below 140° C.

The process in accordance with the present invention makes it easy to provide modified polyester products having a cotton-like hygroscopicity, soil-release property, anti-static property, melt resistance without a serious decrease in strength, and in color fastness.

The invention is described in further detail in the following examples.

EXAMPLES 1-3 AND COMPARATIVE EXAMPLE 1-3

A twill textile (weight of 180 gr./m$^2$) of a 150-denier, 48-filament, false-twisted textured polyester (polyethylene terephthalate) yarn was subjected to relaxing, scouring, drying, and intermediate setting under ordinary conditions; immersed in a mixture solution with a bath ratio of 1:20 that contains 2 g/l of an emulsifier of 14 mols ethylene oxide adduct to nonylphenol, 5 g/l of monochlorobenzene, and 3 g/l of benzoyl peroxide; and subjected to catalyst pretreatment for 30 minutes at 80° C. after gradual temperature elevation. Next the textile was washed with water, immersed in a solution with a bath ratio of 1:20 that contains 10 g/l of each of acrylic acid and methacrylic acid, and subjected to graft polymerization at 110° C. for 60 minutes. The weight increase carried by grafted polymer was 14% based on the original weight of the twill textile.

Next the twill textile was immersed in a dyeing bath with a bath ratio of 1:20 that contains 0.32% owf of C.I. disperse yellow 79, 1.2% owf of C.I. disperse red 72, 1.12% owf of C.I. disperse blue 225, 0.5 g/l of a TAMORU dispersing agent (condensation product of naphthalene sulfonic acid and formaldehyde) and 0.3 cc/l of acetic acid, and subjected to dyeing with Color Pet Dyeing Machine (manufactured by Nippon Dyeing Machine Co., Ltd.) for 60 minutes at a high temperature of 130° C. and a high pressure (1.4 Kg/cm$^2$.G).

Next the twill textile was washed with water, immersed in an aqueous solution of 100 g/l of soda ash and subjected to sodium replacement under the following conditions so that a modified polyester textile with a small decrease in strength, a high color fastness, and a hygroscopicity substantially equal to that of cotton was obtained.

Sodium replacement conditions:
Example 1—40° C.×8 hours
Example 2—60° C.×1 hour
Example 3—75° C.×30 minutes The twill textiles subjected to sodium replacement under the same conditions as the examples before dyeing and dyed under the same conditions or under the same conditions except that no acetic acid was added to the dyeing liquid, all decreased considerably in strength and color fastness (Comparative examples 1-3).

The hygroscopicity of the textiles was measured in terms of their weight change after they were kept above a saturated aqueous solution of sodium nitrite (20° C.×65% RH) for 24 hours after being completely dried for 2 hours at 110° C.

Their strength was measured in accordance with JIS L1079 and their color fastness was determined in accordance with the following.
Color fastness to washing: JIS L0844
Color fastness to wet friction: JIS L0849
Color fastness to light: JIS L0842

TABLE 1

| | Treatment | Hygroscopicity (%) | Tearing resistance (g) |
|---|---|---|---|
| Example 1 | Graft-dyeing-Na replacement, 40° C. | 8.1 | 920 |
| Example 2 | Graft-dyeing-Na replacement, 60° C. | 8.4 | 780 |
| Example 3 | Graft-dyeing-Na replacement, 75° C. | 8.5 | 430 |
| Comparative example 1 | Graft-Na replacement, 40° C. - dyeing | 8.0 | 230 |
| Comparative example 2 | Graft-Na replacement, 60° C. - dyeing | 8.2 | 225 |
| Comparative example 3 | Graft-Na replacement, 75° C. - dyeing | 8.3 | 110 |
| Untreated polyester | — | 0.2 | 1,070 |

TABLE 2

| | Color fastness to washing | | | |
|---|---|---|---|---|
| | Color fastness | Color fading & discoloration | Color fastness to wet friction | Color fastness to light |
| Example 1 | Class 4 | Classes 4-5 | Classes 4-5 | Higher classes than 4 |
| Example 2 | 3-4 | Classes 4-5 | Classes 4-5 | Higher classes than 4 |
| Example 3 | 3 | 3-4 | 4 | 3-4 |
| Comparative example 1 | 1-2 | 3-4 | 2-3 | Lower classes than 3 |
| Comparative example 2 | 1 | " | " | Lower classes than 3 |
| Comparative example 3 | 1 | 3 | 2 | Lower classes than 3 |
| Untreated polyester | 4-5 | 4-5 | 4-5 | Higher classes than 4 |

EXAMPLE 4 AND COMPARATIVE EXAMPLES 4-9

A twill textile (weight of 180 g/m$^2$) of the 150-denier 48-filament false-twisted polyester (polyethylene terephthalate) was subjected to relaxing and refinery, drying and intermediate setting under ordinary conditions. Further the twill textile was subjected to:

(A) Graft polymerization (process A)

Polymerization initiator pre-treatment was carried out in a mixture liquid with a bath ratio of 1:30 that contains 2 g/l 14 mols ethylene oxide adduct to nonyl phenol as an emulsifier, 5 g/l of monochlorobenzene swelling agent, and 2 g/l of benzoyl peroxide polymerization initiator. Next the thus-obtained textile was immersed in a liquid with a bath ratio of 1:30 that contains 8 g/l of each of acrylic acid and methacrylic acid, heated and subjected to graft polymerization at 110° C. for 60 minutes.

(B) Swelling agent removal (process B)

Graft-polymerized textile was subjected to dry heating at 180° C. for 60 seconds and the swelling agent was removed.

(C) Dyeing (process C)

The textile was immersed in a dyeing liquid with a bath ratio of 1:30 that contains 3% owf of C.I. disperse blue 224, 0.5 g/l of a TAMORU disperser and 0.2 cc/l of acetic acid, and subjected to dyeing at a high temperature of 130° C. and a high pressure with Color Pet Dyeing Machine (manufactured by Nippon Dyeing Machine Co., Ltd.) for 60 minutes.

(D) Alkali metal replacement (process D)

The dyed textile was immersed in a liquid with a bath ratio of 1:30 that contains 7 g/l of sodium carbonate for alkali metal replacement at 75° C. for 30 minutes (process D).

Further the textile was washed with hot water, hydroextracted and subjected to dry heat finish setting at 140° C. for 60 seconds so that a modified polyester textile with a hygroscopicity of 8.3%, substantially equal to that of cotton, high physical properties (size stability and decrease in strength were not problematic), and a high color fastness to washing and light (Example 4) was obtained. Its hydroxyl group replaced with the alkali metal was measured by an acid-alkali neutralization dripping method to weight $6.9 \times 10^{-4}$ g equivalent/g of fiber.

For comparison, polyester product textiles were made according to the processes of the Example without step B (A-C-D . . . Comparative example 4), B put at the end of the processing sequence (A-C-D-B . . . Comparative example 5), B preceded by D (A-D-B-C . . . Comparative example 6), B and D exchanged (A-D-C-B . . . Comparative example 7), and C and D exchanged (A-B-D-C . . . Comparative example 8). However they were all problematic in any of physical properties such as size stability and strength as well as color fastness to washing and light. The results of the comparison are tabulated below.

TABLE 3

| | Processing process | Hidroscopicity (%) | Strength (g) | Size stability & washing shrinkage | | Color fastness | |
|---|---|---|---|---|---|---|---|
| | | | | Longitudinal | Lateral | To washing | To light |
| Example 1 | A-B-C-D | 8.3 | 870 | 1.5 | 1.7 | Classes 3-4 | Higher classes than 4 |
| Comparative example 4 | A-C-D | 8.3 | 150 | 5.2 | 4.7 | 2-3 | Lower classes than 3 |
| Comparative example 5 | A-C-D-B | 8.3 | 290 | 1.7 | 1.7 | 3 | 3 |
| Comparative | A-D-B-C | 8.3 | 210 | 1.3 | 1.7 | 2 | 3 |

TABLE 3-continued

|  | Processing process | Hidro-scopicity (%) | Strength (g) | Size stability & washing shrinkage | | Color fastness | |
|---|---|---|---|---|---|---|---|
|  |  |  |  | Longi-tudinal | Lateral | To washing | To light |
| example 6 Comparative example 7 | A-D-C-B | 8.3 | 110 | 1.9 | 1.5 | 2-3 | Lower classes than 3 |
| Comparative example 8 | A-B-D-C | 8.3 | 180 | 1.6 | 1.7 | 2 | 4 |
| Comparative example 9* Untreated polyester | C-D | 0.2 | 990 | 1.5 | 1.3 | 3 | Higher classes than 4 |

*Textile dyed in the same manner as the example without graft modification

Their hygroscopicity was measured in terms of their weight change after being kept in an atmosphere above an aqueous solution of sodium nitrite (20° C. × 65% RH) after being absolutely dried for two hours at 110° C.

Their strength was measured in accordance with JIS L1079 and their color fastness was determined as follows:

Color fastness to washing: JIS L0844
Color fastness to light: JIS L0842

Their size stability (washing shrinkage) was measured in accordance with JIS L1018.

EXAMPLE 5

A dyed polyester product with a high dyeing stability, a small decrease in strength, and a high color fastness to washing and light was successfully obtained through processes A-C-B-D under the same conditions as Example 1.

What is claimed is:

1. A process for producing modified polyester products, comprising dyeing a polyester product obtained by the graft polymerization of a polyester with vinyl monomers having an acidic group and replacing said acidic hydrogen atom with an alkali metal salt, wherein said replacing is carried out after said dyeing.

2. A process for producing modified polyester products according to claim 1, wherein said replacing is carried out at a temperature under 80° C.

3. A process for producing modified polyester products according to claim 2, wherein said replacing is carried out at a temperature under 60° C.

4. A process for producing modified polyester products according to claim 1 to 3, wherein graft polymerization is carried out in the presence of both a swelling agent for the polyester and a polymerization initiator and said replacement is carried out after removing said swelling agent.

5. A process for producing modified polyester products according to claim 4, wherein the removal of said swelling agent is carried out at a temperature over 160° C. in the dry state.

* * * * *